United States Patent
Brotherston et al.

(10) Patent No.: US 12,380,491 B2
(45) Date of Patent: Aug. 5, 2025

(54) SYSTEMS AND METHODS FOR MANAGING ONLINE STOREFRONTS

(71) Applicant: The Toronto-Dominion Bank, Toronto (CA)

(72) Inventors: Daniel Scott Brotherston, Kitchener (CA); Anil Stewart Bakhle, Guelph (CA); Matthew Renold Ladzik, Waterloo (CA); Stefany Pantuso, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 139 days.

(21) Appl. No.: 17/877,203

(22) Filed: Jul. 29, 2022

(65) Prior Publication Data
US 2024/0037640 A1 Feb. 1, 2024

(51) Int. Cl.
*G06Q 30/0601* (2023.01)
*G06Q 30/0204* (2023.01)

(52) U.S. Cl.
CPC ..... *G06Q 30/0643* (2013.01); *G06Q 30/0205* (2013.01)

(58) Field of Classification Search
CPC ............ G06Q 30/0643; G06Q 30/0205
USPC ........................................ 705/7.34
See application file for complete search history.

(56) References Cited

U.S. PATENT DOCUMENTS

| | | | |
|---|---|---|---|
| 8,566,142 B2 * | 10/2013 | McCarney | H04M 3/42068 705/7.29 |
| 8,671,009 B1 | 3/2014 | Coley et al. | |
| 9,842,317 B2 | 12/2017 | Jordan | |
| 10,282,766 B2 * | 5/2019 | Rellas | G06Q 20/203 |
| 11,010,739 B2 | 5/2021 | Bell et al. | |
| 11,182,709 B2 * | 11/2021 | DaCosta | G08G 5/55 |

(Continued)

FOREIGN PATENT DOCUMENTS

| | | |
|---|---|---|
| WO | 2019151703 A1 | 8/2019 |
| WO | 2021105642 A1 | 6/2021 |

OTHER PUBLICATIONS

"Top 10 Online Appointment Scheduling Software", published in Pat Research, https://www.predictiveanalyticstoday.com/top-appointment-scheduling-software/, Apr. 18, 2022.

*Primary Examiner* — Abdallah A El-Hage Hassan
(74) *Attorney, Agent, or Firm* — Rowand LLP

(57) ABSTRACT

A computer-implemented method is disclosed. The method includes: receiving a second request to create a first service object instance of a first service object; identifying a first set of service object instances that are related to the first service object instance based on at least a time associated with the first service object instance and a first service location; obtaining location data associated with a first set of service object instances; determining a geographical area associated with a second request based on the location data associated with the first set of service object instances and a first service location; and causing to be displayed, in a map interface, an interactive map UI element showing a map region corresponding to the geographical area, the map UI element including graphical representations of the first service object instance, the first set of service object instances, and a current location associated with the merchant.

18 Claims, 7 Drawing Sheets

(56) References Cited

U.S. PATENT DOCUMENTS

| | | | |
|---|---|---|---|
| 11,334,821 B1* | 5/2022 | Babu | G06Q 10/06314 |
| 2002/0116232 A1 | 8/2002 | Rapp et al. | |
| 2015/0149286 A1* | 5/2015 | Brown, II | G06Q 30/0267 |
| | | | 705/14.58 |
| 2016/0117761 A1* | 4/2016 | Griffin | G06Q 30/0601 |
| | | | 705/27.1 |
| 2017/0293950 A1* | 10/2017 | Rathod | G06Q 30/0283 |
| 2018/0268349 A1 | 9/2018 | Martinson et al. | |
| 2019/0392357 A1* | 12/2019 | Surti | G06Q 10/047 |
| 2020/0288274 A1* | 9/2020 | Burcheci | H04W 4/029 |
| 2022/0019981 A1 | 1/2022 | Bhattacharya et al. | |
| 2022/0292543 A1* | 9/2022 | Henderson | G06Q 30/0252 |

* cited by examiner

SYSTEMS AND METHODS FOR MANAGING ONLINE STOREFRONTS

TECHNICAL FIELD

The present application relates to user interfaces and, more particularly, to systems and methods for managing interfaces of online stores on e-commerce platforms.

BACKGROUND

Certain e-commerce platforms enable merchants to create online storefronts which can be used by prospective customers to access the merchants' product catalogues. An online storefront that is provided on an e-commerce platform may require extensive set-up and involve complicated procedures for operating the storefront. These and other related factors (e.g., high subscription costs) represent barriers to entry for merchants that seek a lightweight solution for establishing an online retail presence.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
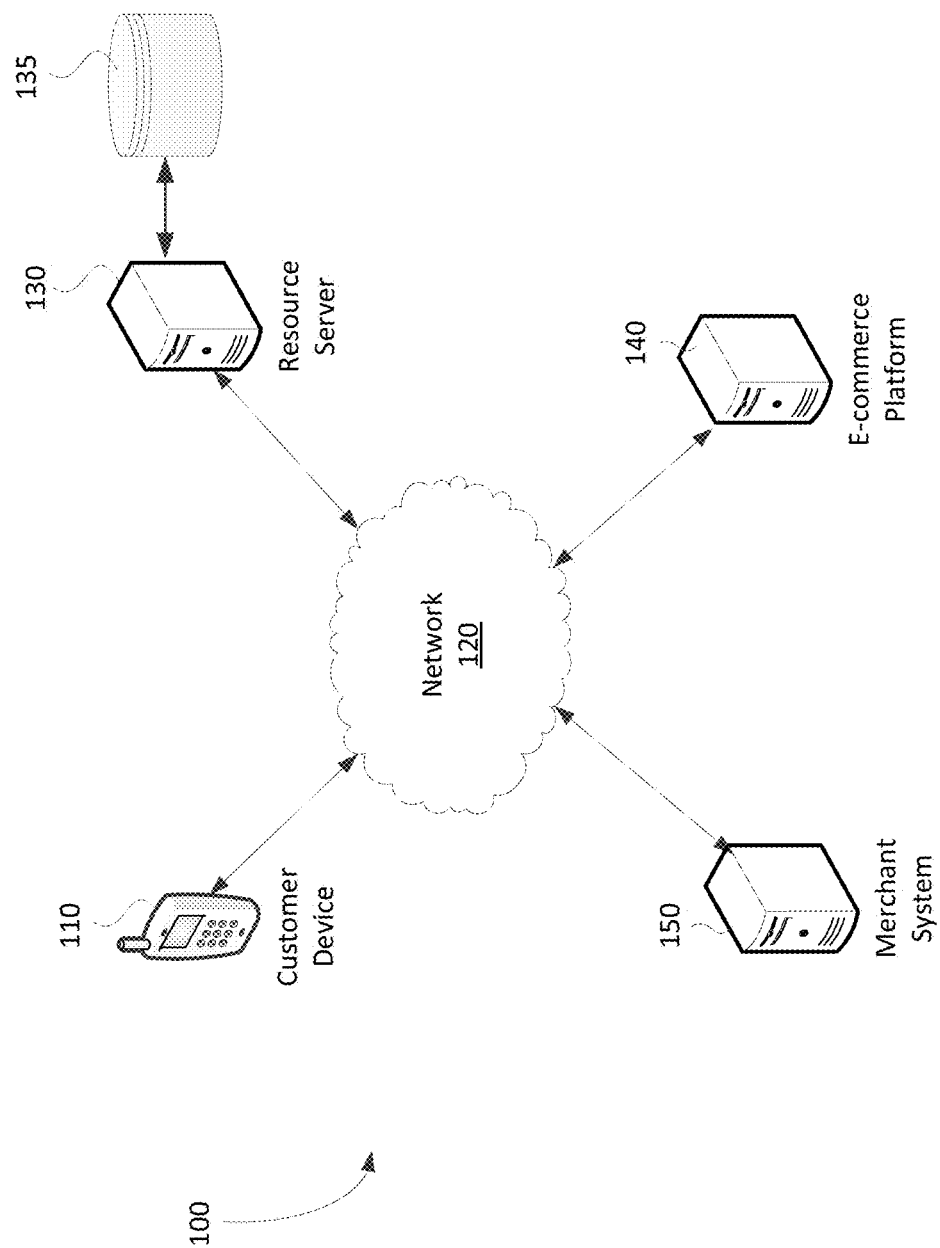
FIG. 1 illustrates an example system for managing an online storefront on an e-commerce platform.

In an aspect, the present disclosure describes a computing system. The computing system includes a processor and a memory coupled to the processor. The memory stores computer-executable instructions that, when executed by the processor, configure the processor to: provide, on a merchant device, a graphical user interface (GUI) for managing an online storefront of the merchant, wherein the providing includes displaying selectable user interface (UI) elements for generating at least one merchant service object and enabling a location-based feature associated with the at least one merchant service object; receive, via the GUI on the merchant device, a first request to generate a first service object and enable the location-based feature in connection with the first service object; receive, via a customer device, a second request to create a first service object instance of the first service object, the second request including a selection of the first service object and an indication of a first service location; identify a first set of service object instances that are related to the first service object instance based on at least a time associated with the first service object instance and the first service location; obtain, via queries of a database over a network, location data associated with the first set of service object instances; determine a geographical area associated with the second request based on the location data associated with the first set of service object instances and the first service location; and cause to be displayed, in a map interface associated with the GUI, an interactive map UI element showing a map region corresponding to the geographical area, the map UI element including graphical representations of the first service object instance, the first set of service object instances, and a current location associated with the merchant.

In some implementations, the GUI may comprise a user interface for a scheduling tool that is provided on an e-commerce platform for scheduling merchant services associated with the merchant.

In some implementations, the selectable UI elements may include at least one input UI element for receiving merchant definition of service information.

In some implementations, the selectable UI elements may include at least one toggle element for enabling location tracking in connection with service object instances of the first service object and the first request may include a selection of the at least one toggle element.

In some implementations, the second request may include an indication of a service time at which the first merchant service is requested to be performed.

In some implementations, identifying the first set of service object instances may include determining one or more service object instances having service times falling within a time range that includes a service time associated with the first service object instance.

In some implementations, the first set of service object instances may include at least one service object instance that precedes the first service object instance and at least one service object instance that follows the first service object instance.

In some implementations, determining the geographical area associated with the second request may include: identifying a subset of the first set of service object instances based on geographical proximity to the first service location; and determining a map region that encompasses locations associated with the service object instances of the subset.

In some implementations, causing the interactive map UI element to be displayed may include causing a graphical representation of a projected route to the first service location to be displayed.

In some implementations, the instructions, when executed, may further configure the processor to: receive, via the merchant device, user input for confirming acceptance of the first service object instance; and store, in the memory, service details associated with the first service object instance.

In another aspect, the present disclosure describes a computer-implemented method. The method includes: providing, on a merchant device, a graphical user interface (GUI) for managing an online storefront of the merchant, wherein the providing includes displaying selectable user interface (UI) elements for generating at least one merchant service object and enabling a location-based feature associated with the at least one merchant service object; receiving, via the GUI on the merchant device, a first request to generate a first service object and enable the location-based feature in connection with the first service object; receiving, via a customer device, a second request to create a first service object instance of the first service object, the second request including a selection of the first service object and an indication of a first service location; identifying a first set of service object instances that are related to the first service object instance based on at least a time associated with the first service object instance and the first service location; obtaining, via queries of a database over a network, location data associated with the first set of service object instances; determining a geographical area associated with the second request based on the location data associated with the first set of service object instances and the first service location; and causing to be displayed, in a map interface associated with the GUI, an interactive map UI element showing a map region corresponding to the geographical area, the map UI element including graphical representations of the first service object instance, the first set of service object instances, and a current location associated with the merchant.

Other aspects and features of the present application will be understood by those of ordinary skill in the art from a review of the following description of examples in conjunction with the accompanying figures. Example embodiments of the present application are not limited to any particular operating system, system architecture, mobile device architecture, server architecture, or computer programming language.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . ." is intended to cover any one or more of the listed elements, including any one of the listed elements alone, any sub-combination, or all of the elements, without necessarily excluding any additional elements, and without necessarily requiring all of the elements.

In the present application, the term "e-commerce platform" refers broadly to a computerized system (or service, platform, etc.) that facilitates commercial transactions, namely buying and selling activities conducted over a computer network (e.g., Internet). An e-commerce platform may, for example, be a free-standing online store, a social network, a social media platform, and the like. Customers can initiate purchase and sell transactions, and any associated payment requests, via an e-commerce platform, and the e-commerce platform may be equipped with transaction/payment processing components or delegate such processing activities to one or more third-party services. An e-commerce platform may be extendible by connecting one or more additional sales channels representing platforms where products can be sold. In particular, the sales channels may themselves be e-commerce platforms, such as Facebook Shops™, Amazon™, etc.

Service appointments are appointments made by customers to request that certain services be rendered by a service provider. (The terms "service provider" and "merchant" will be used interchangeably in the description below.) A service appointment generally requires, at least, the following information to be specified by the requesting customer: type of service, requested date and time, and identity of service provider. Certain service appointments may require additional information. In particular, for services that are available to be rendered at different locations, customers may need to specify location-identifying information as part of their service appointment requests. By way of example, certain cleaning or personal grooming services may be rendered either at a service provider's designated place of business or at the customer's desired location (e.g., customer's home or office). Certain other services, such as automobile repair, may only be rendered at the service provider's designated location (i.e., auto body shop).

In order for a service provider to reliably use an online facility, such as a virtual storefront, to manage their service offerings, the service provider would typically set up an online store on an e-commerce platform and configure the design and functionalities of the online store. The initial set-up generally involves customization of themes and layouts, add-ons, and other store settings, many of which are not be immediately relevant to the management of service offerings. As a result, service providers may be delayed or face undue burden when trying to avail their services to customers through a traditional online store. Furthermore, a user interface, such as a website or mobile application, for such an online store may require a substantial amount of computing resources (e.g., processor, memory, etc.) to run on customer and merchant devices. For example, certain features of the user interface, e.g., a map interface which may be used to track locations of requested service appointments and service providers, may be CPU intensive and require significant resources to properly render on computing devices.

Accordingly, it is desirable to provide a user interface for online storefronts that allows for economizing on computing resources while still providing functionalities that enable merchants and customers to coordinate effectively in the delivery of services.

Reference is first made to FIG. 1, which illustrates, in block diagram form, an example system 100 for managing online storefronts on an e-commerce platform. As shown in FIG. 1, the system 100 may include customer devices 110, a resource server 130, an e-commerce platform 140, a merchant system 150, and a network 120 connecting one or more of the components of the system 100.

As illustrated, the resource server 130 (which may also be referred to as a resource management system) and one or more customer devices 110 communicate via the network 120. The customer device 110 is a computing device. For example, the customer device 110 may be a device of an entity having resources that are associated with the resource server 130. The customer device 110 may take a variety of forms including, for example, a mobile communication device such as a smartphone, a tablet computer, a wearable computer such as a head-mounted display or smartwatch, a laptop or desktop computer, or a computing device of another type.

The resource server 130 may track, manage, and maintain resources, make lending decisions, and/or lend resources for a plurality of clients. The resources may, for example, include computing resources, such as memory or processor cycles. As a further example, the resources may include stored value, such as fiat currency, which may be represented in one or more databases. For example, as shown in FIG. 1, the resource server 130 may be coupled to a database 135, which may be provided in secure storage. The secure storage may be provided internally within the resource server 130 or externally; the secure storage may, for example, be provided remotely from the resource server 130. In some embodiments, the secure storage may include one or more data centers. The data centers may, for example, store data with bank-grade security.

The database 135 may include records for a plurality of accounts and at least some of the records may define a quantity of resources associated with an entity. For example, an entity that is associated with a customer device 110 may be associated with a resource account having one or more records in the database 135. The data records may reflect a quantity of stored resources that are associated with the entity. Such resources may include owned resources and, in at least some embodiments, borrowed resources (e.g., resources available on credit). The quantity of resources that are available to or associated with an entity may be reflected by a balance defined in an associated record such as, for example, a bank balance.

In the example of FIG. 1, the resource server 130 may provide both resource transfer processing (e.g., electronic fund transfers) and data holding (e.g., banking) functions. In particular, the resource server 130 may be both a financial institution server and also a payment transaction processing server. The resource server 130 may, in some embodiments, be a proxy server, serving as an intermediary for requests for customer devices 110 seeking resources from other servers. The resource server 130 may, for example, be a financial institution server and the entity associated with a customer device 110 may be a customer of a financial institution operating the financial institution server.

As shown in FIG. 1, the system 100 may include an e-commerce platform 140. The e-commerce platform 140 facilitates activities of electronically buying and selling products over the Internet. The e-commerce platform 140 integrates online facilities for merchants to manage their business. Merchants may utilize the e-commerce platform 140 for enabling or managing commerce with customers, such as by implementing a commerce experience with customers through online stores. An online store represents a facility comprising one or more storefronts. A merchant can configure and/or manage a storefront by, for example, customizing the look and feel of a user interface (e.g., a website) associated with the storefront. An online store may serve content to customer devices 110 through the network 120. For example, an online store may serve or send content in response to requests for data from customer devices 110 and allow customers to browse and purchase available products.

A merchant may manage aspects of their online store using a graphical user interface. Various different types of GUIs for online storefronts are contemplated by the present disclosure. In some embodiments, the GUI may be in the form of an administrator console. An administrator console may be provided, for example, by the e-commerce platform 140 and accessed by a merchant (or an authorized administrator) on a webpage, mobile application, and the like. A merchant may log in to the administrator console using a merchant device and review, configure, modify, and otherwise manage their online store using the administrator console. An administrator console may include interfaces for accessing and managing various aspects of the merchant's business, such as product orders, service appointment schedules, sales channels, customer engagement, and the like.

FIG. 1 illustrates the resource server 130 and the e-commerce platform 140 as separate components, but they could also be implemented as a single entity within the system 100. For example, in some embodiments, the resource server 130 may implement various functions associated with the e-commerce platform 140. Specifically, the resource server 130 may provide services for facilitating buy and sell activities of resource account holders. The resource server 130 may maintain data records associated with resource accounts of one or more merchant entities. For those merchants, the resource server 130 may provide various online facilities to manage their business. In particular, the resource server 130 may be configured to implement online stores for merchants that have accounts at the resource server 130. The online stores may allow merchants to offer their products (e.g., goods, services) for sale electronically to customers.

The customer devices 110, the resource server 130, the e-commerce platform 140, and the merchant system 150 may be in geographically disparate locations. Put differently, the customer devices 110 may be remote from the resource server 130, the e-commerce platform 140, and/or the merchant system 150. As explained herein, the customer devices 110, the resource server 130, the e-commerce platform 140, and the merchant system 150 are computing systems.

The network 120 is a computer network. In some embodiments, the network 120 may be an internetwork such as may be formed of one or more interconnected computer networks. For example, the network 120 may be or may include an Ethernet network, an asynchronous transfer mode (ATM) network, a wireless network, or the like.

Figure 2:
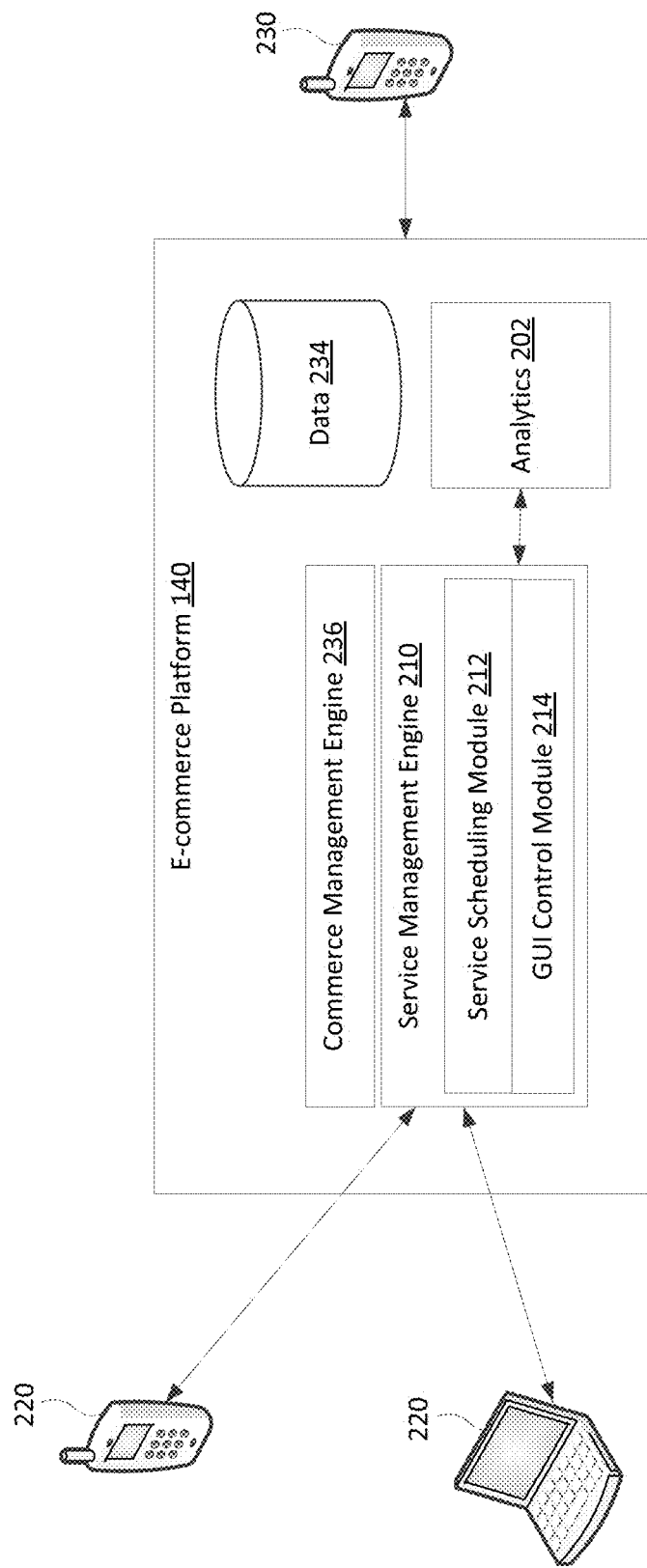
FIG. 2 is a block diagram of an example e-commerce platform.

Reference is made to FIG. 2, which illustrates an example embodiment of the e-commerce platform 140. The customer devices 220 and the merchant device 230 may be communicably connected to the e-commerce platform 140. In at least some embodiments, the customer devices 220 and the merchant device 230 may be associated with accounts of the e-commerce platform 140. Specifically, the customer devices 220 and the merchant device 230 may be associated with entities (e.g., individuals) that have accounts in connection with the e-commerce platform 140. For example, one or more customer devices 220 and merchant device 230 may be associated with customers (e.g., customers having e-commerce accounts) or merchants having one or more online stores in the e-commerce platform 140. The e-commerce platform 140 may store indications of associations between viewer/merchant devices and merchants or customers of the e-commerce platform, for example, in the data facility 234.

The e-commerce platform 140 includes a commerce management engine 236, a service management engine 210, a data facility 234, and a data store 202 for analytics relating to streaming media. The commerce management engine 236 may be configured to handle various operations in connection with e-commerce accounts that are associated with the e-commerce platform 140. For example, the commerce management engine 236 may be configured to retrieve e-commerce account information for various entities (e.g., merchants, customers, etc.) and historical account data, such as transaction events data, browsing history data, and the like, for selected e-commerce accounts. In particular, the commerce management engine 236 may obtain account information for e-commerce accounts of viewers and/or broadcasters of live media streams that are associated with the e-commerce platform 140.

The functionality described herein may be used in commerce to provide improved customer or buyer experiences. The e-commerce platform 140 may implement the functionality for any of a variety of different applications, examples of which are described herein. Although the service management engine 210 of FIG. 2 is illustrated as a distinct component of the e-commerce platform 140, this is only an example. An engine could also or instead be provided by another component residing within or external to the e-commerce platform 140. In some embodiments, one or more applications that are associated with the e-commerce platform 140 may provide an engine that implements the functionality described herein to make it available to customers and/or to merchants. Furthermore, in some embodiments, the commerce management engine 236 may provide that engine. However, the location of the service management engine 210 may be implementation specific. In some implementations, the service management engine 210 may be provided at least in part by an e-commerce platform, either as a core function of the e-commerce platform or as an application or service supported by or communicating with the e-commerce platform. Alternatively, the service management engine 210 may be implemented as a stand-alone service to clients such as a customer device or a merchant device. In addition, at least a portion of such an engine could be implemented in the merchant device and/or in the customer device. For example, a customer device could store and run an engine locally as a software application.

The service management engine 210 is configured to implement at least some of the functionality described herein. Although the embodiments described below may be implemented in association with an e-commerce platform, such as (but not limited to) the e-commerce platform 140, the embodiments described below are not limited to e-commerce platforms.

The service management engine 210 implements operations for managing the provision of merchant services to customers of the e-commerce platform 140. Merchant services refer to services that are offered by a merchant (i.e., a service provider) to customers and may include, for example, consulting services, personal grooming services (e.g., hairdressing, manicure/pedicure, dental hygiene, etc.), social services (e.g., childcare, elderly care, etc.), construction services (e.g., carpentry, plumbing, electricians, etc.), cleaning, repair and maintenance services (e.g., gardeners, mechanics, etc.), education services (e.g., tutoring, libraries, etc.), financial services (e.g., valuation, tax services, etc.), logistics (e.g., transport, warehousing, packaging, etc.), and the like. The service management engine 210 enables merchants to manage aspects of their service offerings to customers such as, but not limited to, appointment scheduling, customer notifications, payments processing, customer complaint resolution, service data storage and maintenance, and the like. For example, the service management engine may implement or include a service scheduling module 212 that is configured to process service requests, schedule customer appointments, and coordinate service providers for appointments. Additionally, or alternatively, the service management engine may implement or include a GUI control module 214 that provides a merchant GUI, such as an administrator console. The merchant GUI enables merchants to interface with control elements (e.g., user interface elements) for managing aspects of their service offerings. For example, the GUI control module 214 may be configured to add, delete, or modify graphical elements of a merchant GUI and process user input received via the merchant GUI. The service scheduling module 212 and the GUI control module 214 may cooperate in implementing one or more of the methods described herein. In particular, one or both of the service scheduling module 212 and the GUI control module 214 may be configured to perform certain operations of the service management engine 210.

The data facility 234 may store data collected by the e-commerce platform 140 based on the interaction of merchants and customers with the e-commerce platform 140. For example, merchants provide data through their online sales activity. Examples of merchant data for a merchant include, without limitation, merchant identifying information, product data for products offered for sale, online store settings, geographical regions of sales activity, historical sales data, and inventory locations. Customer data, or data which is based on the interaction of customers and prospective purchasers with the e-commerce platform 140, may also be collected and stored in the data facility 234.

Figure 3A:
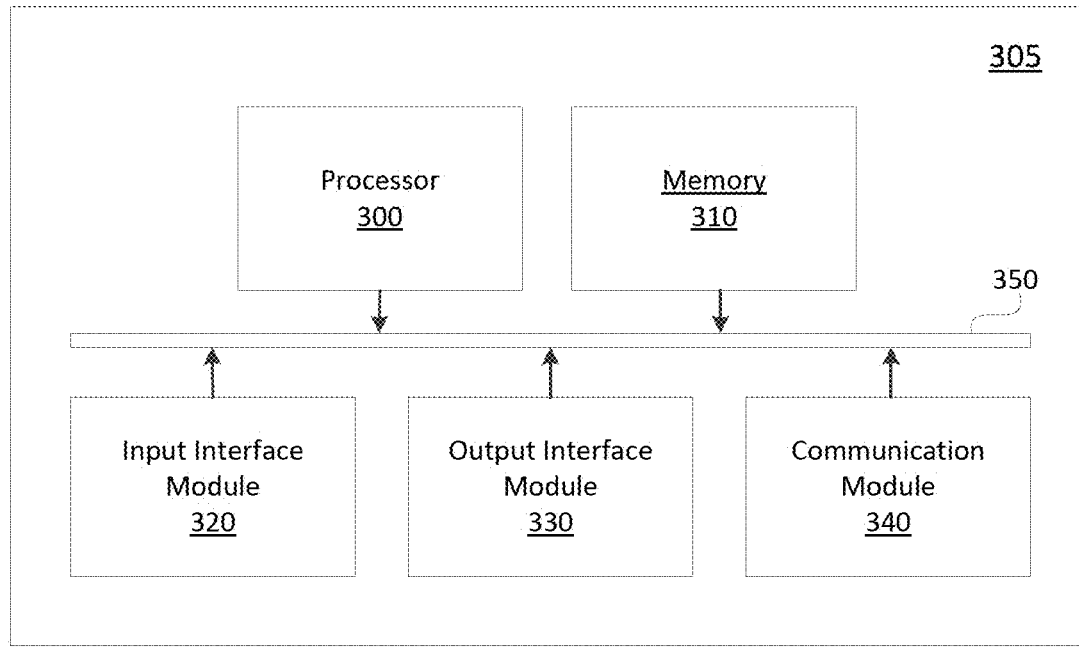
FIG. 3A is high-level schematic diagram of an example computing device.

FIG. 3A is a high-level operation diagram of an example computing device 305. In at least some embodiments, the example computing device 305 may be exemplary of one or more of the customer devices 110, the resource server 130, the e-commerce platform 140, and the merchant system 150 of FIG. 1. The example computing device 305 includes a variety of modules. For example, the example computing device 305, may include a processor 300, a memory 310, an input interface module 320, an output interface module 330, and a communications module 340. As illustrated, the foregoing example modules of the example computing device 305 are in communication over a bus 350.

The processor 300 is a hardware processor. The processor 300 may, for example, be one or more ARM, Intel x86, PowerPC processors or the like.

The memory 310 allows data to be stored and retrieved. The memory 310 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the example computing device 305.

The input interface module 320 allows the example computing device 305 to receive input signals. Input signals may, for example, correspond to input received from a user. The input interface module 320 may serve to interconnect the example computing device 305 with one or more input devices. Input signals may be received from input devices by the input interface module 320. Input devices may, for example, include one or more of a touchscreen input, keyboard, trackball or the like. In some embodiments, all or a portion of the input interface module 320 may be integrated with an input device. For example, the input interface module 320 may be integrated with one of the aforementioned example input devices.

The output interface module 330 allows the example computing device 305 to provide output signals. Some output signals may, for example allow provision of output to a user. The output interface module 330 may serve to interconnect the example computing device 305 with one or more output devices. Output signals may be sent to output devices by output interface module 330. Output devices may include, for example, a display screen such as, for example, a liquid crystal display (LCD), a touchscreen display. Additionally, or alternatively, output devices may include devices other than screens such as, for example, a speaker, indicator lamps (such as for, example, light-emitting diodes (LEDs)), and printers. In some embodiments, all or a portion of the output interface module 330 may be integrated with an output device. For example, the output interface module 330 may be integrated with one of the aforementioned example output devices.

The communications module 340 allows the example computing device 305 to communicate with other electronic devices and/or various communications networks. For example, the communications module 340 may allow the example computing device 305 to send or receive communications signals. Communications signals may be sent or received according to one or more protocols or according to one or more standards. For example, the communications module 340 may allow the example computing device 305 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally, or alternatively, the communications module 340 may allow the example computing device 305 to communicate using near-field communication (NFC), via Wi-Fi™, using Bluetooth™ or via some combination of one or more networks or protocols. Contactless payments may be made using NFC. In some embodiments, all or a portion of the communications module 340 may be integrated into a component of the example computing device 305. For example, the communications module may be integrated into a communications chipset.

Software comprising instructions is executed by the processor 300 from a computer-readable medium. For example, software may be loaded into random-access memory from persistent storage of memory 310. Additionally, or alternatively, instructions may be executed by the processor 300 directly from read-only memory of memory 310.

Figure 3B:
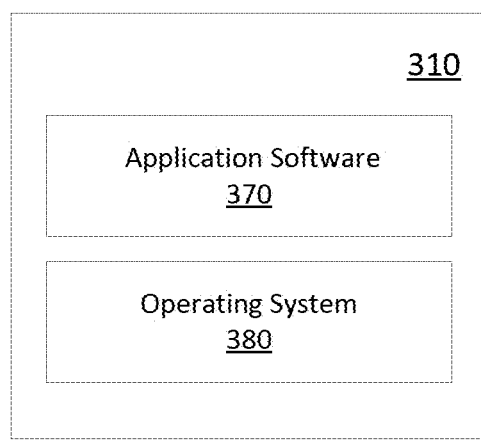
FIG. 3B shows a simplified organization of software components stored in a memory of the computing device of FIG. 3A.

FIG. 3B depicts a simplified organization of software components stored in memory 310 of the example computing device 305. As illustrated, these software components include application software 370 and an operating system 380.

The application software 370 adapts the example computing device 305, in combination with the operating system 380, to operate as a device performing a particular function. The application software 370 may, for example, include a service manager app. A service manager app may be used for coordinating the provision of services by merchants to customers. Customers may use the service manager app to request services that are offered by merchants. The service manager app may be a dedicated app for a single merchant, such that only the services of the single merchant can be requested using the service manager app. Alternatively, the service manager app may be used to browse services offered by a plurality of service providers, and a customer may select a service provider and a related service using the service manager app.

A service manager app may be used by customers and merchants to interface with an e-commerce platform. Customers can access service provider information and listings of available services, and request to schedule service appointments using a service manager app. For example, customers can browse service providers that offer services on the e-commerce platform (e.g., through online stores). Customers can also generate service requests to receive or access desired services using a service manger app. For example, customers can input relevant information, such as personal data, service selection and/or preferences, time and location, etc., for scheduling a service session.

The service manager app may also provide merchants with a means to offer their services to customers without having to set up an extensive online store on an e-commerce platform. A merchant can quickly publish and promote their service offerings on the service manager app, and manage their operations (including appointment scheduling, payment processing, etc.) using the service manager app. In particular, the service manager app may provide merchant-specific features that allow merchants to advertise and administer their business of offering various services to customers.

The service manager app may provide different graphical user interfaces for customers and merchants. That is, merchants may access a first GUI instance and customers may access a second, different GUI instance when using the service manager app. The service manager app may be a stand-alone application, such as a mobile application, or integrated into another application or software module resident on the example computing device 305 as a sub-function or feature.

The service manager app is associated with at least one backend application server. The backend application server may, for example, be a merchant system, such as the merchant system 150 of FIG. 1. In some embodiments, a server which manages an online service may serve as the backend application server for the service manager app. In particular, various functions of the service manager app may be provided, at least in part, by an online service server. For example, a server associated with a bank institution (e.g., a resource server) may perform backend services of the service manager app.

The operating system 380 is software. The operating system 380 allows the application software 370 to access the processor 300, the memory 310, the input interface module 320, the output interface module 330 and the communications module 340. The operating system 380 may be, for example, Apple's iOS™, Android™, Linux™, Microsoft Windows™, or the like.

Figure 4:
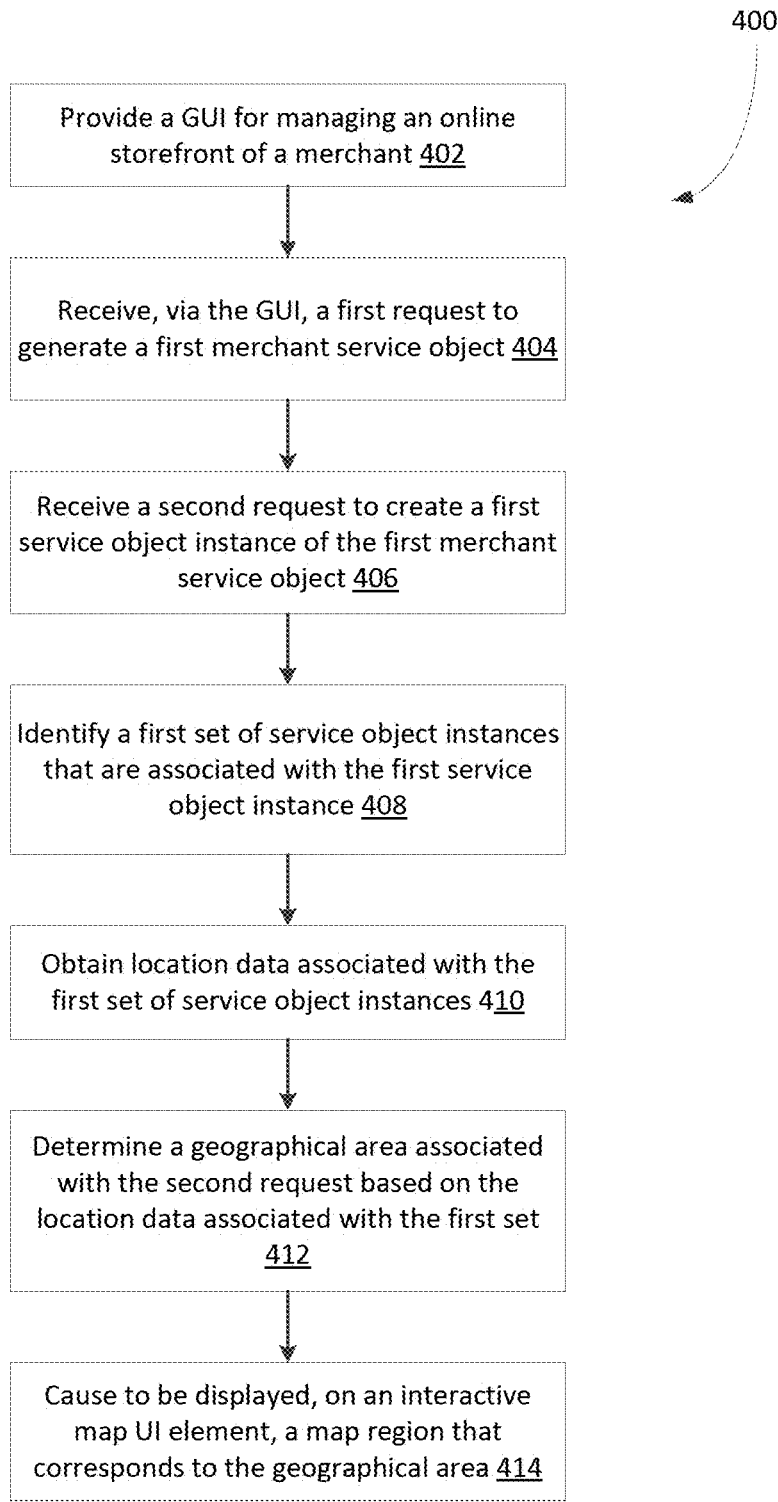
FIG. 4 shows, in flowchart form, an example method of managing an online storefront for providing merchant services.

Reference is now made to FIG. 4, which shows, in flowchart form, an example method 400 of managing an online storefront for providing merchant services. The method 400 may be performed by a computing system that implements service requests processing, such as the service management engine 210 of FIG. 2. As detailed above, the service management engine may be a service that is provided within or external to an e-commerce platform. The service management engine may implement the operations of method 400 to provide merchants on an e-commerce platform with facilities, such as a storefront interface, to manage their service offerings to customers.

Operations starting with operation 402 and continuing onward may be performed, for example, by the processor 300 (FIG. 3A) of a computing device 305 executing software comprising instructions such as may be stored in the memory 310 of the computing device 305. Specifically, processor-executable instructions may, when executed, configure a processor 300 of a computing system implementing a service management engine to perform all or parts of the method 400.

In operation 402, the service management engine provides, on a merchant device, a graphical user interface ("store GUI") for managing an online storefront of the merchant. The store GUI may, for example, be a webpage (e.g., an administrator homepage), a mobile app UI, and the like. The store GUI allows merchants to access, configure, and otherwise manage the merchant's online store. In some embodiments, the store GUI may be in the form of a console, such as an administrator console. The merchant can sign in to the console, using their login credentials, and access store data for their online store. The online store may, for example, comprise a virtual storefront for a service provider. In particular, the store GUI may comprise a user interface for a scheduling tool for scheduling services that are offered by the merchant.

The store GUI presents control elements for managing aspects of the merchant's online store. In particular, the service management engine is configured to display, on the store GUI, selectable user interface elements for performing certain store-related actions. The store GUI includes, at least, user interface elements for creating one or more service objects for the merchant's online store. A service object is a data object that represents a specific service. In the store GUI, a UI element, such as a button, a list (e.g., drop-down list), etc., may be provided, and selection of the UI element may cause to be created a first service object that corresponds to a specific service that the merchant offers. When the UI element is actuated, the store GUI may present additional input control elements that allow the merchant to define service parameters for the first service object. The service parameters may include one or more of the following: name of service, type of service, service description, price(s), time length of service, and available service representatives (e.g., employees of the merchant). The additional UI elements may be in the form of buttons, text fields, checkboxes, and the like.

The store GUI also contains a UI element for enabling a location-based feature associated with the first service object. For example, the UI element may be a toggle, or switch, element for enabling location tracking in connection with service object instances of the first service object. A service object that has a location-related feature enabled may correspond to a service that is capable of being provided as a mobile service, i.e., a service that can be rendered at customer-specified locations. That is, by actuating the UI element (e.g., toggle) on the store GUI, the merchant can classify a service object as representing a mobile service. A mobile service is not limited to being rendered exclusively at merchant-designated service locations, and may instead be available to be provided at places or locations that are specified by customers. In particular, a service provider can provide mobile services to requesting customers by deploying service representatives and instructing them to provide the requested service(s) at places/locations selected by the customers as the desired service location.

Figure 7B:
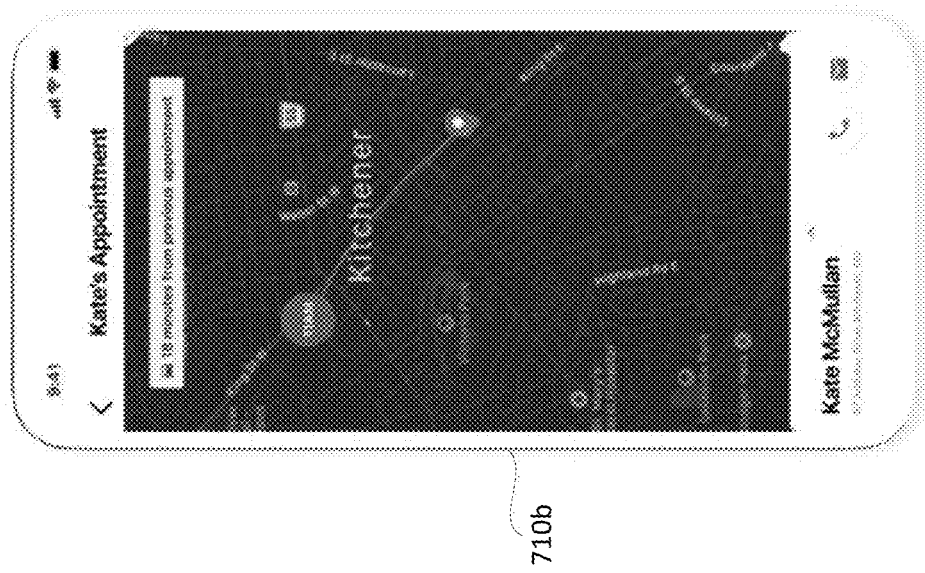
FIGS. 7A-7B show example pages of a graphical user interface for managing an online storefront.
Figure 7A:
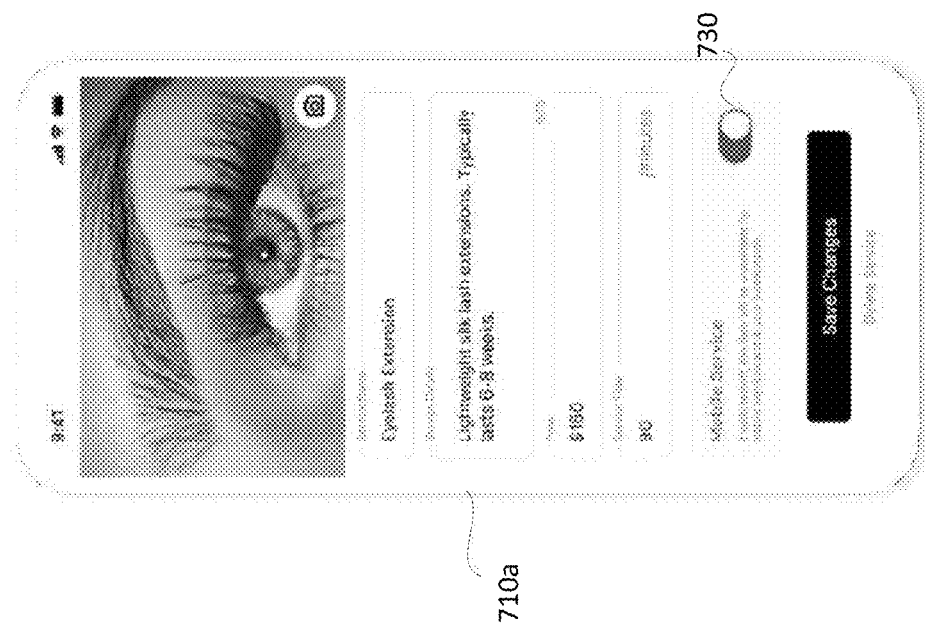

The service management engine receives, via the store GUI on the merchant device, a first request to create a first service object and enable the location-based feature in connection with the first service object, in operation 404. The first service object corresponds to a service that the merchant wishes to provide as part of its service offerings through the online store. The first request includes merchant-inputted data describing the first service object. The input data may comprise, for example, values that are entered in input control elements (e.g., text fields) presented in the store GUI. In some embodiments, where the location-related feature is associated with a switch (or toggle) element, the first request may include a selection to turn on the switch element. FIG. 7A illustrates an example page 710a of a store GUI that includes a plurality of text fields for inputting service parameters of a service object. The text fields may be used to, for example, indicate a service name, provide a description of the service, identify a relevant price, and indicate a time length of the service. The page 710a also contains a toggle element 730 which may be selected to indicate that the service is a mobile service. In this way, the store GUI allows merchants to create service objects and easily classify the created service objects as mobile or non-mobile services. The inputted data can be stored in memory in association with the first service object, for example, by selecting a further UI element on the page 710a for saving the changes made thereto.

In operation 406, the service management engine receives, via a customer device, a second request to create a first service object instance of the first service object. The second request represents a customer's request to receive or access the first service, and the first service object instance represents a service appointment for the customer. The second request includes a selection of the first service object and an indication of a first service location. A customer may access a customer-facing instance of the store GUI which allows the customer to define parameters of the second request. The store GUI may contain input control elements for specifying the first service location, i.e., a location where the first service is desired to be rendered. For services that are classified as a mobile service (based on the merchant's settings at the time of creating the service, the customer may be able to indicate a choice between a designated place of business of the merchant or a place/location of the customer's selection for setting as the first service location. In the latter scenario, the customer can provide an indication of an address for the place/location. The second request also includes an indication of a service time at which the first service is requested to be rendered. The service time may be specified by indicating a date and time of day for the first service object instance.

In operation 408, the service management engine identifies a first set of service object instances that are related to the first service object instance based on at least one of a time associated with the first service object instance or the first service location. That is, the service management engine determines which of the previously scheduled appointments are related to the newly requested service appointment based on the criteria of service time and/or service location. The previously scheduled appointments are represented as service object instances of the first service object or other service objects that are associated with the merchant. In particular, the related appointments may be selected from the set of all service appointments, and not just appointments of the first service. In some embodiments, the service management engine determines one or more service object instances having service times falling within a time range that includes a service time associated with the first service object instance in order to identify the first set. The service object instances of the first set may, for example, be those appointments that are proximate in time to the first service object instance. For example, the first set may include at least one service object instance that precedes the first service object instance and/or at least one service object instance that follows the first service object instance.

The service management engine obtains location data associated with the first set of service object instances, in operation 410. Specifically, the service management engine obtains the location data for the identified service object instances via queries of a database over a computer network. For each service object instance, the location data may specify a merchant-designated place of business or a place/location selected by a customer as the desired service location.

In operation 412, the service management engine determines a geographical area associated with the second request based on the location data associated with the first set of service object instances and the first service location. The geographical area represents a region that is relevant to the second request. In particular, the geographical area is one that is expected to be of interest to the merchant when reviewing the second request in order to determine whether the request for the first service object instance should be accepted or rejected. If the first service object instance is accepted, the merchant's schedule is caused to be updated to include the appointment corresponding to the first service object instance. In some embodiments, the service management engine identifies a subset of the first set of service object instances based on geographical proximity to the first service location, and determines a map region that encompasses locations associated with the service object instances of the subset.

The geographical area information is used to pre-populate a map interface associated with the store GUI to facilitate the merchant's review of the second request. Specifically, the service management engine causes to be displayed, in a map interface associated with the store GUI, an interactive map user interface element showing a map region corresponding to the geographical area, in operation 414. The map UI element includes graphical representations of the first service object instance, the first set of service object instances, and a current location associated with the merchant. In this way, only those relevant appointments that are proximate to the requested first service appointment in time and/or geography are highlighted in the map interface. That is, the service management engine selectively represents scheduled appointments in the map interface to facilitate the merchant's assessment of the first service object instance, i.e., an appointment of the first service.

The map data may allow the merchant to visually assess whether the requested appointment is one that is reasonable or desirable to be included in the merchant's service schedule. In some embodiments, the service management engine may cause a graphical representation of a projected route to the first service location to be displayed. The projected route may, for example, be a route that includes the first service location as a destination and a location associated with a scheduled appointment that immediately precedes the requested first service appointment as a starting point. Alternatively, the projected route may include multiple different locations associated with previously scheduled appointments of the first set. An example page 710b of the store GUI is illustrated in FIG. 7B. The projected route (shown as a green arc in FIG. 7B) may be represented on the map UI element in a manner that is distinguished from rest of the displayed map region. In some embodiments, projected or expected travel time between service locations associated with scheduled appointments may be displayed instead of, or in addition to, the projected route.

In some embodiments, the service management engine may be configured to receive, via the merchant device, user input for confirming acceptance of the first service object instance, and store, in memory, service details associated with the first service object instance. Upon reviewing the second request, the merchant may input, using their device, an indication of whether the request to create the first service object instance is accepted. If accepted, the details of the first service object instance are used to update the merchant's schedule of service appointments. Otherwise, the second request is rejected, and the requesting customer may be notified of the rejection, for example, via notification on the customer's device.

Figure 5:
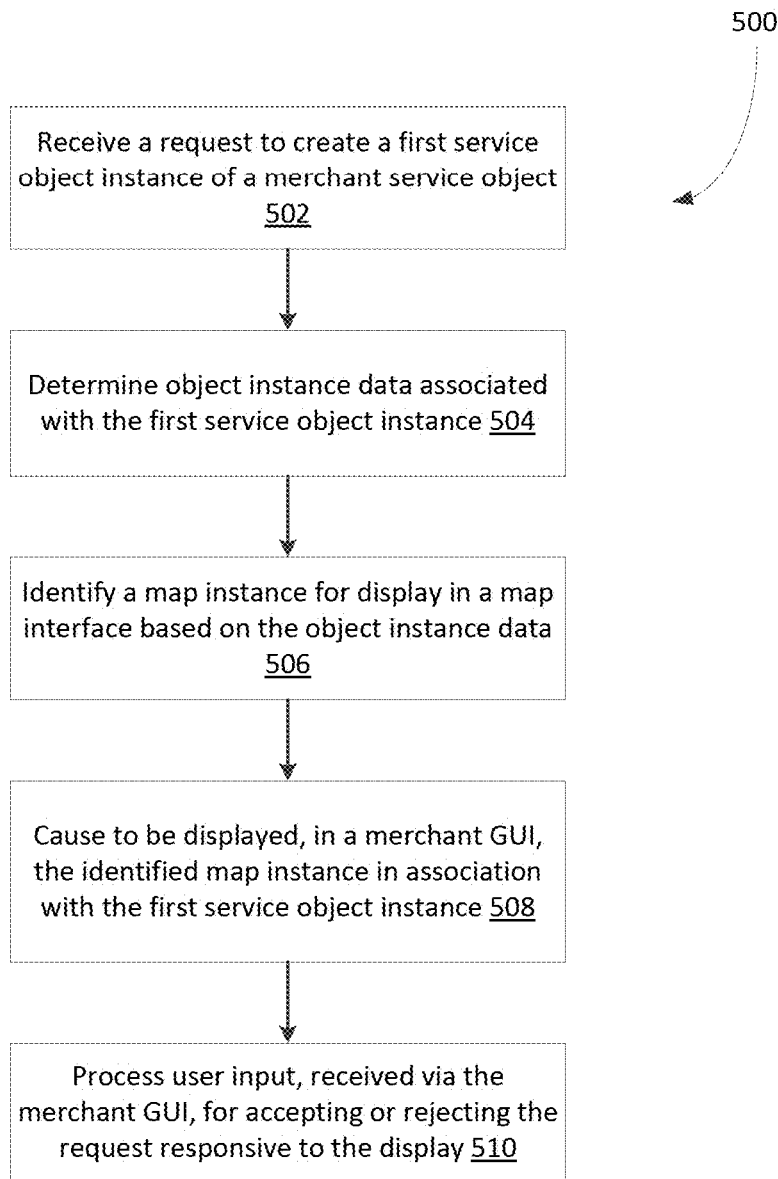
FIG. 5 shows, in flowchart form, another example method of managing an online storefront for providing merchant services.

Reference is now made to FIG. 5, which shows, in flowchart form, another example method 500 of managing an online storefront for providing merchant services. The method 500 may be performed by a computing system that implements service requests processing, such as the service management engine 210 of FIG. 2. As detailed above, the service management engine may be a service that is provided within or external to an e-commerce platform. The service management engine may implement the operations of method 500 to provide merchants on an e-commerce platform with facilities, such as a storefront interface, to manage their service offerings to customers.

Operations starting with operation 502 and continuing onward may be performed, for example, by the processor 300 (FIG. 3A) of a computing device 305 executing software comprising instructions such as may be stored in the memory 310 of the computing device 305. Specifically, processor-executable instructions may, when executed, configure a processor 300 of a computing system implementing a service management engine to perform all or parts of the method 500. The operations of method 500 may be performed in addition to, or as alternatives of, one or more of the operations of method 400.

In operation 502, the service management engine receives a request to create a first service object instance of a service object. The service object may correspond to a service that is offered by a merchant to customers through the merchant's online store. The request may be transmitted via a store GUI on a customer's device. In particular, the customer may request, using the store GUI, to create an appointment of the merchant's service. The store GUI contains input control elements that are selectively presented based on merchant-specified parameters of the service, and the customer inputs request data using one or more of the input control elements to provide requisite appointment information.

The service management engine determines object instance data associated with the first service object instance, in operation 504. In particular, the object instance data may be determined based on the request to create the first service object instance. For example, the object instance data may be provided as part of the request as metadata associated with the object instance. The object instance data includes details of the requested service appointment such as, but not limited to: type of service, requested date and time, and identity of service provider.

In operation 506, the service management engine identifies a map instance for display in a map interface based on the object instance data. The map instance represents a graphical representation of a map region that is relevant to the requested service appointment. In particular, the map instance may display, at least, a service location associated with the requested service appointment. The service location may be a merchant-designated place of business or a place/location that is selected by the customer. In at least some embodiments, the map instance displays a region that includes the requested service location. As described above with reference to method 400, the service management engine may selectively represent, in the map interface, previously scheduled appointments that are related to the requested service appointment. Specifically, the service management engine may identify one or more related appointments based on criteria of time and/or location proximity and determine which of the related appointments to display in the map interface. The service management engine may thus determine a map region covering an area that includes selected ones of the previously scheduled appointments as well as the requested service location.

In operation 508, the service management engine causes to be displayed, in a merchant GUI, the identified map instance in association with the first service object instance. In some embodiments, the map instance may be displayed concurrently or in connection with representative data associated with the first service object instance in a merchant interface of the store GUI. For example, the map instance may be presented in a map interface that allows the merchant to visually assess requested service appointment data, and supplementary information about the requested service may be presented in the store GUI. The map interface may allow for interactivity such that the merchant may manipulate the map instance to display different regions.

In operation 510, the service management engine processes user input, received via the merchant GUI, for accepting or rejecting the request responsive to the display. Upon reviewing the second request, the merchant may input, using their device, an indication of whether the request to create the first service object instance is accepted. If accepted, the details of the first service object instance are used to update the merchant's schedule of service appointments. Otherwise, the second request is rejected, and the requesting customer may be notified of the rejection, for example, via notification on the customer's device.

Figure 6:
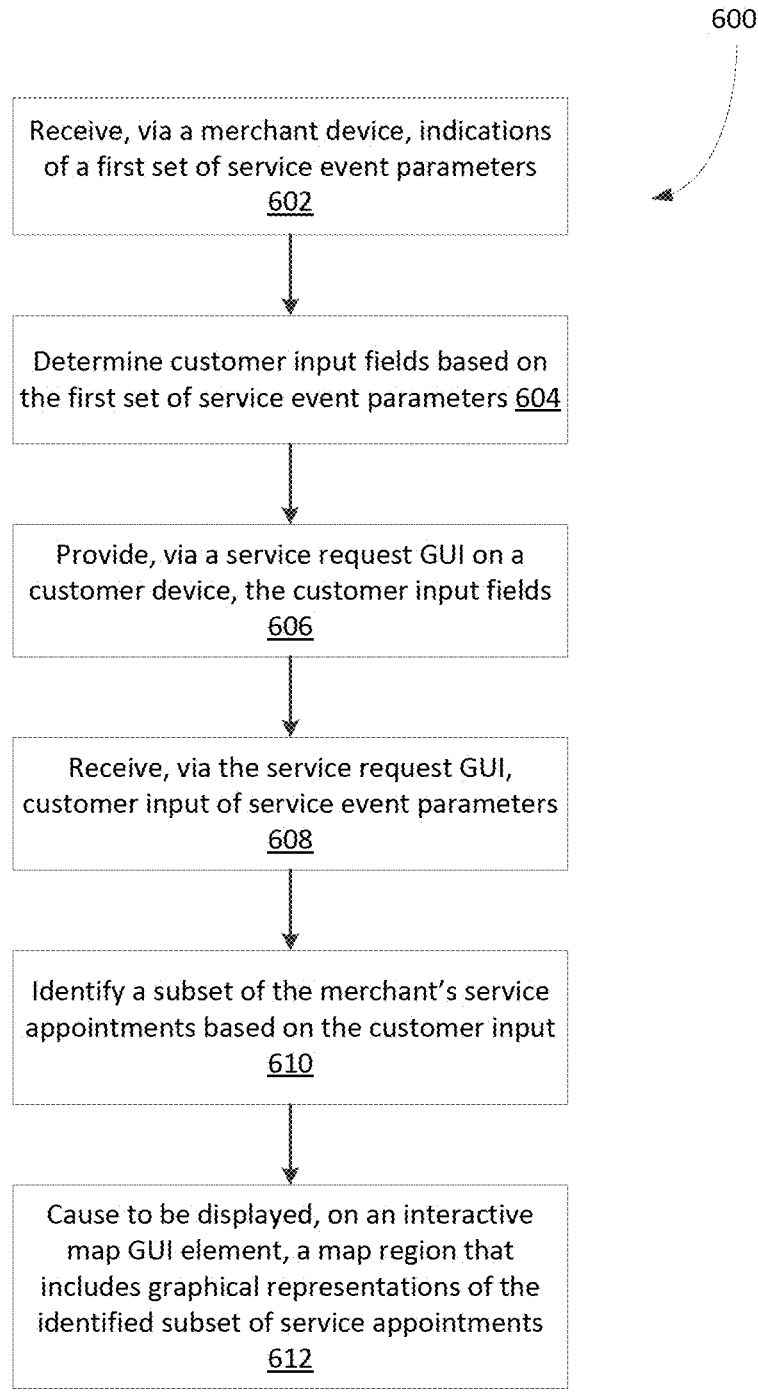
FIG. 6 shows, in flowchart form, another example method of managing an online storefront for providing merchant services.

Reference is now made to FIG. 6, which shows, in flowchart form, another example method 600 of managing an online storefront for providing merchant services. The method 600 may be performed by a computing system that implements service requests processing, such as the service management engine 210 of FIG. 2. As detailed above, the service management engine may be a service that is provided within or external to an e-commerce platform. The service management engine may implement the operations of method 600 to provide merchants on an e-commerce platform with facilities, such as a storefront interface, to manage their service offerings to customers.

Operations starting with operation 602 and continuing onward may be performed, for example, by the processor 300 (FIG. 3A) of a computing device 305 executing software comprising instructions such as may be stored in the memory 310 of the computing device 305. Specifically, processor-executable instructions may, when executed, configure a processor 300 of a computing system implementing a service management engine to perform all or parts of the method 600. The operations of method 600 may be performed in addition to, or as alternatives of, one or more of the operations of methods 400 and 500.

In operation 602, the service management engine receives, via a merchant device, indications of a first set of service event parameters. The service event (or appointment) parameters are parameters that are provided by the merchant as comprising requisite information for service appointment requests by customers. The merchant may, for example, specify certain data requirements that a requesting customer must provide in order to schedule service appointments with the merchant and which will be presented in a store GUI for the merchant's online store.

The service management engine determines customer input fields based on the first set of service event parameters, in operation 604. That is, the service management engine determines suitable user interface elements for receiving, from a customer, the requested information corresponding to the merchant-specified service event parameters. The UI elements may, for example, include text boxes, checkboxes, lists (e.g., dropdown list), and the like.

In operation 606, the service management engine provides, via a service request GUI on a customer device, the customer input fields. The service request GUI is an interface that a requesting customer accesses when creating service appointment requests. In at least some embodiments, the customer input fields are displayed responsive to detecting that a customer has initiated an appointment scheduling request via the service request GUI. For example, the customer input fields may be displayed in response to detecting that a UI element for creating a service appointment has been actuated by user input on a customer device.

In operation 608, the service management engine receives, via the service request GUI, customer input of service event parameters. That is, the customer inputted information pertaining to the service appointment request is received via the service request GUI. Based on the customer input, the service management engine identifies a subset of the merchant's service appointments, in operation 610. In particular, the service management engine determines which of the previously scheduled appointments of the merchant are related to the requested service appointment.

In operation 612, the service management engine causes to be displayed, on an interactive map UI element, a map region that includes graphical representations of the identified subset of service appointments. Specifically, the service management engine causes to be displayed a map region corresponding to a geographical area covering at least some of the identified service appointment. The map UI element may include, in some embodiments, graphical representations of the requested service appointment, the identified previously scheduled appointments, and a current location associated with the merchant.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A computing system, comprising:
a processor; and
a memory coupled to the processor, the memory storing computer-executable instructions that, when executed, configure the processor to:
provide, on a merchant device, a graphical user interface (GUI) for managing an online storefront of the merchant, wherein the providing includes displaying selectable user interface (UI) elements for generating at least one merchant service object and enabling a location-based feature associated with the at least one merchant service object;
receive, via the GUI on the merchant device, a first request to generate a first service object and enable the location-based feature in connection with the first service object;
receive, via a customer device, a second request to create a first service object instance of the first service object, the second request including a selection of the first service object and an indication of a first service location;
identify a first set of service object instances that are related to the first service object instance based on at least a time associated with the first service object instance and the first service location;
obtain, via queries of a database over a network, location data associated with the first set of service object instances;
determine a geographical area associated with the second request based on determining a region that encompasses locations associated with the first set of service object instances and the first service location;

pre-populate interactive map user interface data in a map interface associated with the GUI, the interactive map user interface data comprising a map region corresponding to the geographical area; and update the map interface based on causing a graphical representation of previously scheduled appointments to be displayed, the updating including:

highlighting, in the map interface associated with the GUI, service object instances that are proximate to the first service object instance in at least one of time or geography based on:

identifying a map instance for display in the map interface, the map instance representing a graphical representation of the determined geographical area associated with the second request; and causing to be displayed, in the map interface, the identified map instance in association with the first service object instance based on selectively representing, in the map interface, the first set of service object instances and a current location associated with the merchant; and arranging interface elements of the map interface to display a projected route to the first service location that includes one or more locations associated with previously scheduled service object instances of the identified first set.

2. The computing system of claim 1, wherein the GUI comprises a user interface for a scheduling tool that is provided on an e-commerce platform for scheduling merchant services associated with the merchant.

3. The computing system of claim 1, wherein the selectable UI elements include at least one input UI element for receiving merchant definition of service information.

4. The computing system of claim 1, wherein the selectable UI elements include at least one toggle element for enabling location tracking in connection with service object instances of the first service object and wherein the first request includes a selection of the at least one toggle element.

5. The computing system of claim 1, wherein the second request includes an indication of a service time at which the first merchant service is requested to be performed.

6. The computing system of claim 1, wherein identifying the first set of service object instances comprises determining one or more service object instances having service times falling within a time range that includes a service time associated with the first service object instance.

7. The computing system of claim 6, wherein the first set of service object instances comprises at least one service object instance that precedes the first service object instance and at least one service object instance that follows the first service object instance.

8. The computing system of claim 1, wherein determining the geographical area associated with the second request comprises:

identifying a subset of the first set of service object instances based on geographical proximity to the first service location; and determining a map region that encompasses locations associated with the service object instances of the subset.

9. The computing system of claim 1, wherein the instructions, when executed, further configure the processor to:

receive, via the merchant device, user input for confirming acceptance of the first service object instance; and store, in the memory, service details associated with the first service object instance.

10. A computer-implemented method, comprising:

providing, on a merchant device, a graphical user interface (GUI) for managing an online storefront of the merchant, wherein the providing includes displaying selectable user interface (UI) elements for generating at least one merchant service object and enabling a location-based feature associated with the at least one merchant service object;

receiving, via the GUI on the merchant device, a first request to generate a first service object and enable the location-based feature in connection with the first service object;

receiving, via a customer device, a second request to create a first service object instance of the first service object, the second request including a selection of the first service object and an indication of a first service location;

identifying a first set of service object instances that are related to the first service object instance based on at least a time associated with the first service object instance and the first service location;

obtaining, via queries of a database over a network, location data associated with the first set of service object instances;

determining a geographical area associated with the second request based on determining a region that encompasses locations associated with the first set of service object instances and the first service location;

pre-populating interactive map user interface data in a map interface associated with the GUI, the interactive map user interface data comprising a map region corresponding to the geographical area; and updating the map interface based on causing a graphical representation of previously scheduled appointments to be displayed, the updating including:

highlighting, in the map interface associated with the GUI, service object instances that are proximate to the first service object instance in at least one of time or geography based on:

identifying a map instance for display in the map interface, the map instance representing a graphical representation of the determined geographical area associated with the second request; and causing to be displayed, in the map interface, the identified map instance in association with the first service object instance based on selectively representing, in the map interface, the first set of service object instances, and a current location associated with the merchant; and arranging interface elements of the map interface to display a projected route to the first service location that includes one or more locations associated with previously scheduled service object instances of the identified first set.

11. The method of claim 10, wherein the GUI comprises a user interface for a scheduling tool that is provided on an e-commerce platform for scheduling merchant services associated with the merchant.

12. The method of claim 10, wherein the selectable UI elements include at least one input UI element for receiving merchant definition of service information.

13. The method of claim 10, wherein the selectable UI elements include at least one toggle element for enabling location tracking in connection with service object instances of the first service object and wherein the first request includes a selection of the at least one toggle element.

14. The method of claim 10, wherein the second request includes an indication of a service time at which the first merchant service is requested to be performed.

15. The method of claim 10, wherein identifying the first set of service object instances comprises determining one or more service object instances having service times falling within a time range that includes a service time associated with the first service object instance.

16. The method of claim 15, wherein the first set of service object instances comprises at least one service object instance that precedes the first service object instance and at least one service object instance that follows the first service object instance.

17. The method of claim 10, wherein determining the geographical area associated with the second request comprises:
   identifying a subset of the first set of service object instances based on geographical proximity to the first service location; and
   determining a map region that encompasses locations associated with the service object instances of the subset.

18. The method of claim 10, further comprising:
receiving, via the merchant device, user input for confirming acceptance of the first service object instance; and
storing, in a memory, service details associated with the first service object instance.

* * * * *